J. C. PEABODY.
BATTERY JAR.
APPLICATION FILED NOV. 11, 1914.

1,344,771.

Patented June 29, 1920.
2 SHEETS—SHEET 1.

INVENTOR:
James C. Peabody
by Macleod, Calver, Copeland & Dike
Attys.

J. C. PEABODY.
BATTERY JAR.
APPLICATION FILED NOV. 11, 1914.
1,344,771.
Patented June 29, 1920.
2 SHEETS—SHEET 2.
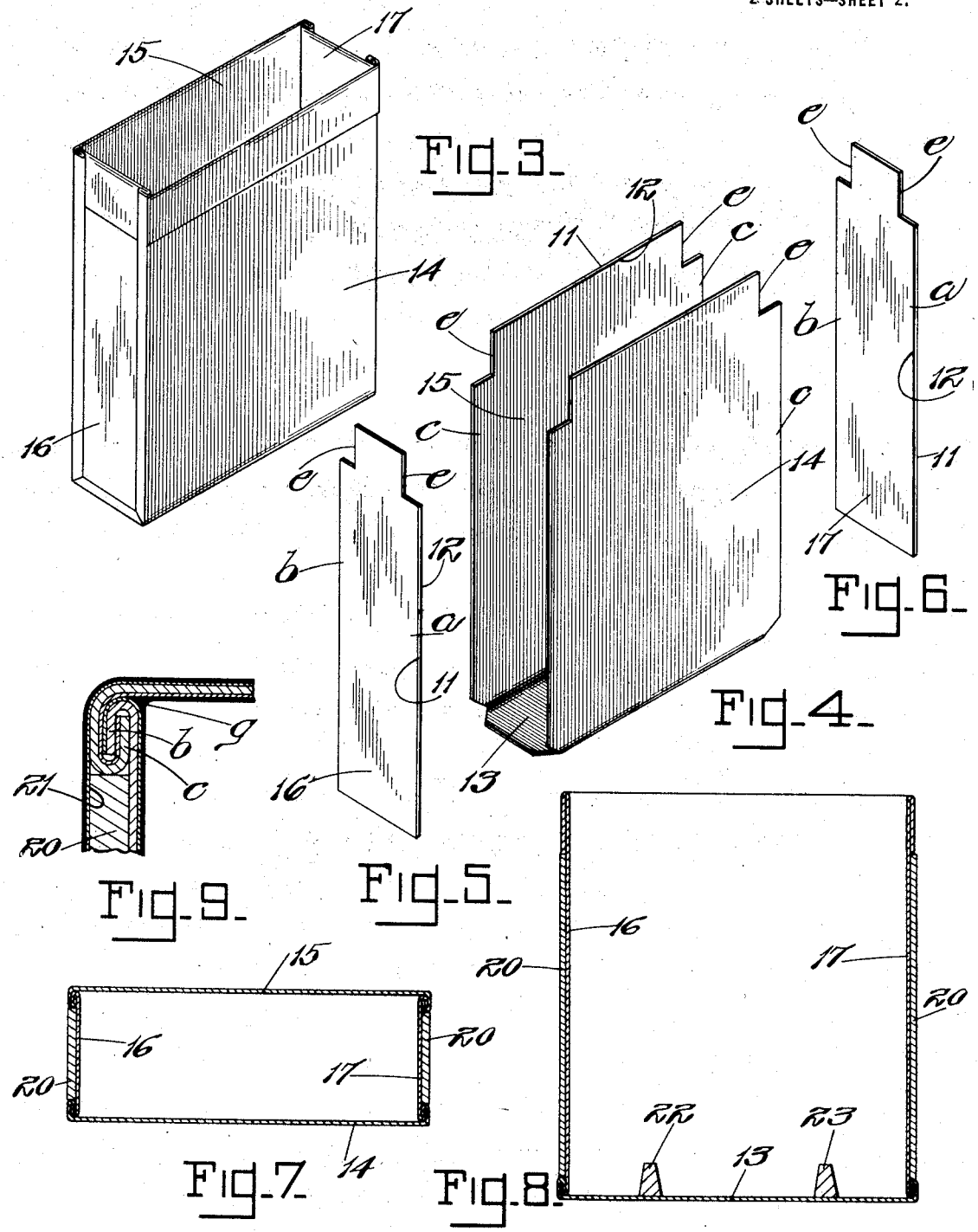
INVENTOR:
James C. Peabody
by Macleod, Calver, Copeland & Dike
Attys.

UNITED STATES PATENT OFFICE.

JAMES C. PEABODY, OF BOSTON, MASSACHUSETTS.

BATTERY-JAR.

1,344,771.  Specification of Letters Patent.  Patented June 29, 1920.

Application filed November 11, 1914. Serial No. 871,627.

*To all whom it may concern:*

Be it known that I, JAMES C. PEABODY, citizen of the United States, residing at Boston, county of Suffolk, State of Massachusetts, have invented a certain new and useful Improvement in Battery-Jars, of which the following is a specification, reference being had therein to the accompanying drawings.

My invention relates to a new and improved container especially adapted for use as a battery jar and also the novel process of making it. As is well known to those skilled in this art, battery jars must be made of insulating material capable of resisting acid, should be light in weight, strong, not likely to fracture, soften or become distorted, and it is desirable that they should be inexpensive, and should occupy the least possible space consistent with the necessary strength. The battery jar embodying my present invention combines all of the advantages named above.

While I have described my invention in the subsequent description as embodied in a battery jar, it is obvious that the container may be employed for any one of a variety of uses where the qualities named or most of them, are important.

My improved battery jar is made from a thin sheet of metal referred to herein as the metal backing, to which is applied, on both sides preferably, a facing of absorbent fibrous material, as for instance, paper. This absorbent material is treated and preferably permeated by an acid-resisting substance, as for instance, China-wood oil, or the like, or a mixture of oil and rosin which is subsequently hardened. The container is preferably made by folding together the margins of the sheet of metal after the facing has been applied thereto in such a manner that the folded margins are on the outside of the container and therefore are thoroughly protected from the acid or other contents of the container. The material described forms a tough, insulating, acid resisting protective layer upon the metal backing which prevents the acid or other contents from coming in contact with the metal. This protective coating is of such a nature that it does not fracture or become impaired by the use to which the jar is subjected.

My invention also includes the novel process herein described of making the said container. While I have specified certain materials as those from which my improved container is made, I do not limit myself to these materials as my invention is a broad one and it will be apparent to those skilled in the art that other materials may be substituted for those named herein.

My invention will be fully understood from the following description when taken in connection with the accompanying drawings and the novel features thereof will be clearly pointed out and defined in the claims at the close of this specification.

Referring to the drawings, Figure 1 is a view in perspective of the finished battery jar embodying my invention.

Fig. 3 is a view in perspective of the battery jar before the outside protective layer has been applied.

Fig. 4 shows a piece forming the bottom and sides.

Fig. 5 shows one end, and

Figures 1, 2:
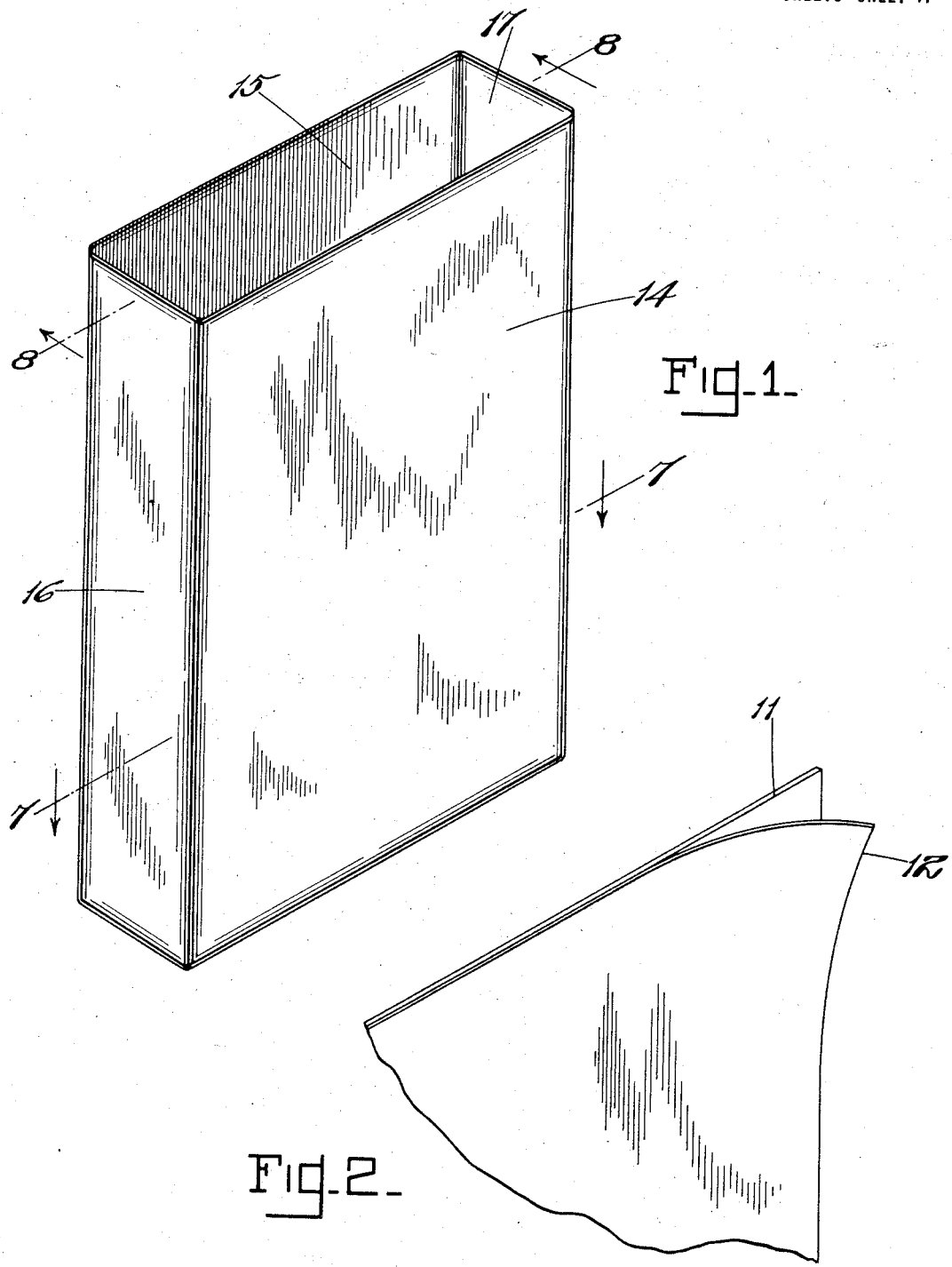
Fig. 2 is a view of the sheet of material to which the facing has been applied.

Fig. 6 the other end.

Fig. 7 is a horizontal section on line 7—7 of Fig. 1, looking downward.

Fig. 8 is a vertical section on line 8—8 of Fig. 1 looking in the direction of the arrows.

Fig. 9 is an enlarged cross-section showing the layers of material and the construction of the joint.

In manufacturing my improved container, I prefer to proceed as follows,—A sheet 11 of thin metal as for instance sheet iron or tin plate has applied to it on one side a facing 12 of some absorbent fibrous material, preferably paper of the required thickness. This facing is secured to the metal by any suitable adhesive, such as a starch paste or sizing. The adhesion of the facing to the sheet metal backing may be improved by subjecting the parts to pressure, as for instance by means of rolls or presses. Thereafter, the parts of the container are cut from the sheet of faced metal formed as just described. The bottom 13 and sides 14 and 15 are formed in one piece, see Fig. 4, while the ends 16 and 17 are formed separately as shown in Figs. 5 and 6. Notches $e$ are cut from the sides and ends near the top to permit the edges to be folded together. The parts are then assembled and secured to each other by folding together the adjacent edges as will be seen in Figs. 7, 8, and 9, and so that the facing 12 is on the inside of the container. This is conveniently done by giving the edges *a* and *b* of the ends a U-shaped fold as seen in Fig. 9 while the edge *c* of the sides is inserted between the legs of the U formed as described and then folded around it as shown clearly in Fig. 9. This results in locking together firmly the proximate parts of the container without the use of solder or rivets. It will be seen that the entire interior of the container is fully covered by the facing which forms a lining. It will also be seen that the margin of the sheet metal backing of one member is folded into the U-shaped portion of the other member so that it is perfectly protected from attack by the acid. It will further be seen that the seam thus formed lies on the exterior of the container and is therefore at a distance from the acid which does not penetrate beyond the point *g* for reasons which will be later explained. The hollows on the outer sides of the ends caused by the seams are then preferably filled by strips of paper 20 of the required thickness, and a thin layer 21 of the absorbent fibrous material is pasted over the entire exterior of the container. Thin paper is conveniently used for this purpose.

The container having been made up in the form described, the facing material is treated with some substance which is acid resisting or which renders the facing acid resisting and is preferably treated in such a manner as to cause the said substance to permeate completely the facing material. The acid resisting substance thus employed may be any one of a variety of well known acid resisting substances and may be applied in liquid form with or without rosin, or suitable resins or gums in a solvent. The preferred acid resisting substance is China-wood oil; linseed oil and rosin is suitable, as well as many other similar materials. To force the acid resisting substance into the pores of the facing and to insure the most complete permeation, the vacuum and pressure process well known to those skilled in this art may be employed. It is desirable to force into the absorbent facing as large an amount of the acid resisting substance as possible in order that there may be a slight excess thereof. The acid resisting material is then hardened by drying or baking, according to the nature of the material employed as the acid resisting substance. Where baking is resorted to in drying and hardening the acid resisting material, it will be found that during the baking the slight excess of the acid resisting substance left in the absorbent facing material has flowed out and filled the crevices of the container at the seams as shown at G (see Fig. 9) and has become hardened so that an impenetrable barrier to the acid is formed at the seams. This result may also be obtained by flowing a little of the acid resisting material into the joints before the hardening takes place.

At 22 and 23 are shown two bridges made of any suitable material as for instance, wood properly protected as by impregnation, compressed fiber, hard rubber or the like.

In the foregoing description, I have referred to the backing as being composed of sheet metal, but it is obvious that it is only necessary to have a thin layer of metal beneath the protective coating of fibrous material and acid resisting compound regardless of whether this metal layer is produced by rolling, casting, drawing or spinning.

Obvious variations in carrying out my invention may be employed, as for instance, employing a paper which has been rendered acid resisting before it is secured to the sheet metal backing, or applying the acid resisting material to the sheet metal backing and then applying the absorbent fibrous facing thereto.

The facing as thus treated and applied is flexible and tough and adheres with great tenacity to the metal backing. The backing may be readily bent or subjected to hard usage without flaking off of the facing or otherwise injuring it. The container or battery jar constructed as described herein is very light, being hardly heavier than a tin box of the same size, is somewhat elastic, does not fracture or crack and permit the acid to attack the sheet metal backing, may be manufactured for a fraction of the cost of a hard rubber battery jar, resists acid equally well and has proved in actual use to be entirely durable.

What I claim is:

1. A container suitable for a battery jar having a bottom and four vertical sides, the bottom and two sides being formed of a single blank and each of the two other sides being formed of a single blank, each blank consisting of a sheet metal backing having the entire inner face covered by a sheet of absorbent fibrous material adhesively secured thereto, the adjacent marginal portions of the contiguous blanks being united together by folding together the said marginal portions in such manner that all of the said folds are on the exterior of the finished container, the marginal portions of the absorbent facings as well as of the backings being inclosed in the folds, said absorbent facings being permeated with an acid resisting substance.

2. A container suitable for a battery jar having a bottom and four vertical sides, the bottom and two sides being formed of a single blank and each of the two other sides being formed of a single blank, each blank consisting of a sheet metal backing having the entire inner face covered by a sheet of absorbent fibrous material adhesively secured thereto, the adjacent marginal portions of the contiguous blanks being united together by folding together the said marginal portions in such manner that all of the said folds are on the exterior of the finished container, the marginal portions of the absorbent facings as well as of the backings being inclosed in the folds, the said absorbent facings being permeated with an acid resisting substance, a layer of absorbent material in each of the hollows on the outer sides between the folds, and a covering of fibrous material adhesively secured to the entire outside of the container.

3. A container suitable for a battery jar having a bottom and four vertical sides formed of a plurality of sheets, each of which has a metallic backing and a facing of absorbent fibrous material, the adjacent marginal portions of the contiguous sheets being united together by folding together the said marginal portions in such manner that the marginal portions of the absorbent facings, as well as of the backing, are inclosed in the folds, said absorbent facings being permeated with an acid resisting substance, and the crevices between the adjacent edges of the walls of the container on the inner side formed by said folded marginal portions being closed by said acid resisting substance in excess of that which permeates the facing.

4. A container suitable for a battery jar which consists of a sheet metal backing having thereon an inner facing of an absorbent material permeated by an acid resisting substance, the sides and the bottom being formed of a single sheet and each of the two ends being formed of a single sheet, the sides and ends being secured together by folding together the adjacent margins of said parts, the said facing of absorbent material covering the entire inner exposed face of the finished container, and also extending over the face of the in-folded portions the metallic backings of adjacent faces being separated from each other by the interposed facing of absorbent material permeated by the acid resisting substance.

5. A container suitable for a battery jar, which consists of a sheet metal backing having thereon an inner facing of an absorbent material permeated by an acid resisting substance, the sides and ends being secured together by folding together the adjacent margins of said parts with the folds on the outside of the finished container, said facing of absorbent material extending over the inner surface of the finished container and over the inner faces of the folded portions, the hollows on the outer sides of the ends caused by the folds being filled with fibrous material and the metallic backings of adjacent faces being separated from each other by the interposed facing of absorbent material permeated by the acid resisting substance.

6. A container suitable for a battery jar which consists of a sheet metal backing having thereon an inner facing of an absorbent material permeated by an acid resisting substance, the sides and ends being secured together by folding together the adjacent margins of said parts with the folds on the outside of the finished container, said facing of absorbent material extending over the inner surface of the finished container and over the inner faces of the folded portions, and a layer of absorbent material permeated with acid resisting substance pasted over the entire exterior of the container the metallic backings of adjacent faces being separated from each other by the interposed facing of absorbent material permeated by the acid resisting substance.

7. The process of making a container suitable for a battery jar which consists in securing to sheet metal a facing of unpermeated absorbent material, forming the container from said combined material, permeating the absorbent facing with an acid resisting substance, and hardening said acid resisting substance.

8. The process of making a container suitable for a battery jar which consists in securing to sheet metal by means of an adhesive a facing of unpermeated absorbent material, cutting therefrom the parts of the container, assembling them, permeating the absorbent facing with an acid resisting substance, and hardening the acid resisting substance.

9. The process of making a container suitable for a battery jar which consists in securing to sheet metal by means of an adhesive a facing of unpermeated absorbent material, cutting therefrom the parts of the container, assembling the same by folding adjacent edges together, permeating the absorbent material with an acid resisting substance, and hardening the acid resisting substance.

10. The process of making a container suitable for a battery jar which consists in forming blank parts for the container out of sheet material having a facing of absorbent material adhesively secured thereto, shaping one of said blank parts to form the bottom and two vertical sides of the finished container and assembling the same with two other blank sheets which form two other vertical sides of the container, by uniting together the adjacent marginal portions of the contiguous blanks by folding together said marginal portions in such manner that the folds all project outwardly, and treating the absorbent material with an acid resisting substance which permeates said absorbent material.

11. A container suitable for a battery jar which consists of a sheet metal backing having thereon an inner facing of an absorbent material permeated by an acid resisting substance, the sides and ends being secured together by folding together the adjacent margins of said parts in such manner that the folds are on the outside of the finished container, the crevices on the inside of the container being all closed by a dried excess supply of the said acid resisting substance.

In testimony whereof I affix my signature, in presence of two witnesses.

JAMES C. PEABODY.

Witnesses:
GEORGE P. DIKE,
ALICE H. MORRISON.